US012639406B2

(12) United States Patent
Wendt et al.

(10) Patent No.: US 12,639,406 B2
(45) Date of Patent: May 26, 2026

(54) SERVICING DEVICES IN A CONNECTED SYSTEM

(71) Applicant: SIGNIFY HOLDING B.V., Eindhoven (NL)

(72) Inventors: Matthias Wendt, Würselen (DE); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 137 days.

(21) Appl. No.: 18/011,872

(22) PCT Filed: Jun. 29, 2021

(86) PCT No.: PCT/EP2021/067847
§ 371 (c)(1),
(2) Date: Dec. 21, 2022

(87) PCT Pub. No.: WO2022/008297
PCT Pub. Date: Jan. 13, 2022

(65) Prior Publication Data
US 2023/0315820 A1 Oct. 5, 2023

Related U.S. Application Data

(60) Provisional application No. 63/048,791, filed on Jul. 7, 2020.

(30) Foreign Application Priority Data

Jul. 16, 2020 (EP) ..................................... 20186134

(51) Int. Cl.
*G06F 21/12* (2013.01)
*G06F 21/00* (2013.01)

(52) U.S. Cl.
CPC .................................. *G06F 21/121* (2013.01)

(58) Field of Classification Search
CPC ...... G06F 21/121; G06F 21/50; G06F 21/604; G06F 21/70; G06F 21/71; G06F 21/82; G06F 21/85; G06F 21/62
See application file for complete search history.

(56) References Cited

U.S. PATENT DOCUMENTS 6,548,967 B1 4/2003 Dowling et al.
9,491,604 B2 11/2016 Michael
(Continued)

FOREIGN PATENT DOCUMENTS

EP 3148236 A1 3/2017
JP 2017212096 A 11/2017
(Continued)

*Primary Examiner* — Edward Zee

(57) ABSTRACT

The present invention relates to servicing devices (10, 10', 10") requiring to be serviced. The devices (10, 10', 10") are included in a connected system (100). A respective operation right is assigned to each of the devices (10, 10', 10"). An operation mode of each of the devices (10, 10', 10") depends on its assigned respective operation right. When a respective one of the devices (10, 10', 10") requiring to be serviced is serviced, an updated operation right is assigned at least to the respective device (10, 10', 10") in dependence of how the respective device (10, 10', 10") is serviced. Access to the device (10, 10', 10") for servicing it may be dependent on an authorization. A functionality of the serviced device (10, 10', 10") may be limited if an unauthorized user serviced the device (10, 10', 10").

16 Claims, 3 Drawing Sheets

(56)         References Cited

U.S. PATENT DOCUMENTS

| | | | |
|---|---|---|---|
| 9,727,749 B2 | 8/2017 | Tzeng et al. | |
| 9,959,400 B2 | 5/2018 | Sorokin et al. | |
| 2004/0187038 A1 | 9/2004 | Yachida | |
| 2005/0198319 A1 | 9/2005 | Chan et al. | |
| 2006/0028212 A1 | 2/2006 | Steiner et al. | |
| 2011/0288658 A1 | 11/2011 | Walters et al. | |
| 2016/0270193 A1 | 9/2016 | Lawrenson et al. | |
| 2017/0188438 A1 | 6/2017 | Vollmer et al. | |
| 2018/0126952 A1 | 5/2018 | Niemiec | |
| 2018/0192264 A1 | 7/2018 | Kwok et al. | |
| 2020/0053112 A1* | 2/2020 | Torisaki | H04L 67/12 |
| 2020/0211301 A1 | 7/2020 | Zhang et al. | |
| 2021/0203682 A1* | 7/2021 | Bajpai | H04L 63/0428 |

FOREIGN PATENT DOCUMENTS

| | | | |
|---|---|---|---|
| WO | 2014197323 A1 | 12/2014 | |
| WO | 2016144748 A1 | 9/2016 | |
| WO | 2017223067 A1 | 12/2017 | |
| WO | 2020107025 A2 | 5/2020 | |
| WO | 2021239672 A1 | 12/2021 | |
| WO | 2021244916 A1 | 12/2021 | |

* cited by examiner

SERVICING DEVICES IN A CONNECTED SYSTEM

CROSS-REFERENCE TO PRIOR APPLICATIONS

This application is the U.S. National Phase application under 35 U.S.C. § 371 of International Application No. PCT/EP2021/067847, filed on Jun. 29, 2021, which claims the benefit of U.S. Provisional Patent Application No. 63/048,791, filed on Jul. 7, 2020 and European Patent Application No. 20186134.1, filed on Jul. 16, 2020. These applications are hereby incorporated by reference herein.

FIELD OF THE INVENTION

The present invention relates to a connected system including a plurality of devices, a method for servicing a device of the connected system that requires to be serviced, and a computer program product for servicing a device of the connected system that requires to be serviced.

BACKGROUND OF THE INVENTION

US 2016/270193 A1 shows a lighting system. The lighting system comprises a lighting device and at least one other device. Both the lighting device and the at least one other device comprises a data storage, a controller and a network interface. The lighting device additionally comprises a light emitter. When the lighting device powers up, the other device transmits a verification value stored in its data storage to the lighting device. The lighting device assesses the verification value in relation to a unique value stored in its data storage to check whether the lighting system knows the lighting device. In dependence of the assessment, the lighting device is controlled to operate in a first or in a second operational mode. In a commissioning procedure the other device may receive the verification value for storage in its data storage.

US 2020/211301A1 discloses techniques for securing electronic control units (ECUs) in a vehicle while allowing secure repairing of the ECUs. A method of repairing a vehicle includes disabling message authentication in secure communication between any two ECUs in a plurality of ECUs on the vehicle, detecting a first ECU that has been changed based on detecting an absence of a valid security key on the first ECU, verifying that a digital certificate associated with the first ECU is a valid certificate, generating one or more security keys for secure communication between the first ECU and a set of ECUs in the plurality of ECUs, provisioning the one or more security keys to the first ECU and the set of ECUs, and enabling the message authentication in secure communication between any two ECUs of the plurality of ECUs.

SUMMARY OF THE INVENTION

It can be seen as an object of the present invention to provide a connected system, a method for servicing a device of a connected system, a computer program product for servicing a device of a connected system, and a computer readable medium which allow an improved servicing of devices requiring to be serviced in a connected system.

In a first aspect of the present invention a connected system is presented. The connected system includes a plurality of devices to each of which a respective operation right is assigned. An operation mode of each of the devices depends on its assigned respective operation right. The connected system is configured, when a respective one of the devices requiring to be serviced is serviced, to assign an updated operation right to at least the respective device in dependence of how the respective device is serviced.

Since the connected system is configured, when a respective one of the devices requiring to be serviced is serviced, to assign an updated operation right to at least the respective device in dependence of how the respective device is serviced, at least a limited functionality of the respective device can be ensured while data security, trustworthiness, and/or safety is not compromised, even when an unauthorized user serviced the respective device requiring to be serviced. This allows safeguarding security and data-trustworthiness of the connected system. In particular, if a device requires to be serviced and no authorized service person is available for servicing the device, an unauthorized user, e.g., with less experience, can service the device. In this case a limited operation right may be assigned to the device serviced by the unauthorized user with an operation mode that allows only a limited functionality of the serviced device. In case that an authorized service person services the device requiring to be serviced, a full operation right may be assigned to the device serviced by the authorized service person which allows operating the serviced device in an operation mode with full functionality. This may allow to reduce a risk of malfunction due to non-competent or sub-optimal servicing of inexperienced and thus unauthorized users. Furthermore, different levels of operation rights may reflect different levels of servicing, such as different changes performed to the serviced device. Additionally, a system stability of the connected system may be enhanced as different operation rights may be assigned in dependence of competence and trustworthiness of the entity that serviced the device of the connected system.

The connected system may include or be a wirelessly connected system, e.g., a connected lighting (CL) system, a building management system (BMS), a connected heating ventilation and air-conditioning (HVAC) system or any other type of wirelessly connected system. The connected system may, for example, also be connected to a BMS. The devices may be wirelessly connected devices, e.g., lighting devices, HVAC devices, sensors, switches, alarm devices, safety devices, security devices, or any other type of wireless device.

A device requiring to be serviced may be, for example, a device that does not function properly, e.g., a device that does not operate within a given tolerance interval of normal operation. A device requiring to be serviced may also include a device requiring regular checking, e.g., checking a device once a year, or a device that is to be serviced because the user wants to make changes to the device, e.g., updating an outdated software. The device requiring to be serviced can be, for example, broken, i.e., one or more parts of the device may be broken, such as for a lighting device, the lighting element may not work properly or an antenna may be broken such that data exchange with the lighting device is limited or not available at all. The device requiring to be serviced may also operate based on an outdated software or firmware. This may compromise security of the device against hacking and thus require servicing of the device, e.g., by updating the device to the newest software or firmware. Furthermore, this may compromise safety of a connected system performing safety functions, e.g., emergency lighting for guiding the way in case of emergency, as performance of the connected system may be reduced when devices operate based on outdated software or firmware.

Servicing the respective device may, for example, include updating software, updating firmware, installing software, adjusting settings, resetting, restarting, repairing, checking, verifying, authorizing a previous service, authorizing a previous service performed by an unauthorized user, and/or changing parts of the device. Authorizing a previous service, e.g., repair, performed by an unauthorized user may be, for example, performed by an authorized service person that checks whether the device has been completely restored by the unauthorized user and that authorizes the servicing of the unauthorized user if the device has been completely restored. Changing parts of the device may include changing, for instance, a functional unit, such as a sensor of the device. Adjusting settings may include adjusting parameters in an algorithm running on the device.

For example, the connected system, e.g., a WiFi communication system, may be at least configured for presence detection. Due to changes in the device itself, e.g., an aging of components or a change of a WiFi channel, or due to changes to the environment the device is arranged in, e.g., replacing a furniture, carpet or wall decoration, the device and/or WiFi communication system may need to be serviced in order to ensure functionality of the WiFi sensing for presence detection. For example, the parameters used by the WiFi communication system may be adjusted or complete parts of the code running on the device may be replaced. Servicing the device by an authorized user may allow keeping trustworthiness of the connected system.

Installing software may also include adding new features to the device. For example, a functionality to perform WiFi sensing may be added to the device by installing a respective software update. The software update may include, adding code to the local algorithm running on the device. The WiFi sensing may be performed by the device. Alternatively, the device may only provide sensor data to a server, e.g., a remote server running in the cloud, which processes the sensor data to perform the WiFi sensing.

Different operation modes may allow to access and use different functionalities of the device. Some operation modes may be restricted, for example, in their functionality, such as an access to certain data or devices, as well as how functions of the device are performed. Certain operation modes may allow only a certain functionality, such that functionality depends on how the respective device was serviced. For example, operation rights may be assigned to a device such that it can only operate in a "safe mode" which is limited to local interaction, e.g., local control of the device, and which does not allow data of the device to be exchanged with a server connected to the connected system. Such a device may, for example, not be controlled via the server and may not upload data to the server. Operation rights may also be assigned to a device such that its functionality is limited with respect to sensor features, such as only being able to detect occupancy but not being able to perform counting of people, as data generated by the sensor of the device is not fully trusted and the accuracy of the data may be insufficient for counting.

The connected system can also be configured for assigning an updated operation right to other devices of the connected system in dependence of how the respective device is serviced. For example, a group of devices may perform a certain function of the connected system. If the respective device that is serviced is included in the group of the devices that performs this certain function, also other devices, e.g., of the group, may be influenced in dependence how the respective device is serviced. This may allow to ensure functionality and reliability of certain functions of the connected system performed by a group of devices even when one or possibly more of the devices were serviced by an unauthorized user.

For example, if the respective device receives a software update, while other devices do not receive the update, the operation rights of the other devices may be limited compared to the operation right of the serviced device with the updated software.

If the group of the devices, for example, performs radio frequency (RF) sensing, detecting occupancy, or illuminating a certain egress path to safety in case of emergency, the operation rights of the other devices of the connected system, e.g., of the group of devices, may also need to be updated when the respective device is serviced. A certain egress path to safety may include sensors that detect whether the certain egress path is safe, e.g., without fire, and luminaires for providing a path of light from the current position of the user to the closest safe exit for the user. The luminaires may be activated in a manner to guide people out of a building via the egress path. If the respective device was serviced by an unauthorized user, for example, a neighboring device of the respective device may take over its function. Therefore, the operation right of the neighboring device may be updated accordingly.

In case that the respective device performs RF sensing, e.g., people counting, and servicing is performed by an unauthorized user, a neighboring device may take over the functions of the respective device, such as processing of the sensor data, performing RF sensing, or reporting a people count.

In case of a connected system in form of a Zigbee mesh network, the respective device that is serviced by an unauthorized user may be, for example, only allowed to participate as end-device in the network and not as a routing node. Another device, e.g., a neighboring device in single hop distance, may act as Zigbee proxy node configured to receive data on behalf of the respective device and hand the data over to the respective device via direct connection to it.

The connected system can be configured for requesting an authorization for servicing the respective device when the respective device is to be serviced. How the respective device can be serviced can depend on a response to the authorization request. This allows to limit access to the device, e.g., if authorization is not granted the device may not be accessed at all for servicing or only limited parts of the device may be serviced in dependence of the response to the authorization request. This may allow to improve the safety, security, and trustworthiness of the connected system, as access management for servicing the device is possible.

How the respective device can be serviced can include to which extent of a previous functionality the respective device can be restored when it is serviced. For example, servicing the respective device may require to open an enclosure of the device or connecting to the respective device via a connection, such as a wireless connection or a physical connection, such as a connector or electrical contacts. The access to certain parts of the device may be limited in dependence of the response to the authorization request. Different authorization levels may grant access to different parts of the device. Different parts of the device may include different hardware and/or different software parts of the device. The respective device may be mechanically locked, logically locked, or both mechanically locked and logically locked. The locks may be opened based on the response to the authorization request, e.g., based on an authorization level of the entity that services the respective device. The respective device may include, for example, a mechanically locked enclosure for mechanically locking the respective device, such that certain parts of the device cannot be opened and accessed for servicing them, e.g., changing parts or repairing them. The respective device may be, for example, logically locked in a service user interface of the respective device for logically locking the respective device, such that certain servicing options are not available in dependence of the response to the authorization request. For example, over the air updates (OTAU) of firmware or access to online resources may depend on the response to the authorization request. Access to these service options may be logically locked and may require a certain authorization level for performing the service options.

How the respective device can be serviced can depend on a location, a function, or both the location and the function of the respective device. This can allow an improved servicing including an improved operation rights management.

The connected system may be configured for updating the operation right of the respective device requiring to be serviced when it is serviced in dependence of the location, the function, or both the location and the function.

The location may include a geographical position of the device, e.g., determined via a positioning system, such as the global positioning system (GPS) or global system for mobile communication (GSM). The geographical position can be used for example to determine location dependent parameters, such as temperature, daytime, or other location dependent parameters. Furthermore, location can also be used to determine in which country or state the device is located. Different countries and states may have different right-to-repair laws. Servicing and access for servicing the device requiring to be serviced may depend on the right-to-repair law of the country or state the device is located in. This may allow an adaption of the device access management and operation rights management in dependence of local right-to-repair laws.

The location may also include, for example, a position inside of a building, e.g., the device may be arranged in a staircase, a lobby, an escape route, an entrance, an exit, a safety critical area, or any other position. The location of the device may be critical for safety, security, or both safety and security.

The function may for example include providing light, guiding a way, recording data, measuring, sensing, signaling, alarming, or any other function.

How the respective device can be serviced can depend on whether the respective device is critical for operating the connected system. This may further improve operation of connected systems with devices critical for its operation.

A device critical for the operation of the connected system may be, for example, a safety critical device, security critical device, or a device associated with critical business operations. Safety critical devices may include, for instance, an emergency lighting device for guiding a way out of a building during an emergency or hazard. Safety critical devices may also include, for instance, a people counting device for counting people that already left the building in case of emergency or hazard. Both functionalities may also be integrated in a combined safety critical device. A security critical device may be, for example, an alarm device arranged at an entrance to a building or premises. The functionalities may also be combined in a safety and security critical device.

In case that the device is, for example, a lighting device in an escape route its function is providing light to guide a way out during an emergency. As the location is in an escape route, providing light may be safety critical in case of an emergency. Such a lighting device requires immediate servicing and it may not be possible to wait for an authorized service person to become available for servicing the lighting device. Servicing by an unauthorized user may therefore ensure at least providing light albeit with limited functionality or trustworthiness of the lighting device.

The device may be, for example, a sensor device for recording measurement data, such as a temperature, humidity, brightness, occupancy of a room, or any other type of measurement data. This data may be used for operating the connected system, e.g., in case of a CL system, lighting devices may be activated by the CL system when occupancy of the room is detected.

The connected system may be configured for determining which operation rights to assign to the respective device requiring to be serviced when it is serviced. Determining which operation rights to assign to the respective device may be, for example, based on weighing benefits and risks associated with assigning the operation right. This may allow to optimize operation of the connected system.

If the device is a sensor device requiring to be serviced which measures data that is critical for the operation of the connected system, possibly at a location which is critical for the operation, the sensor device may, for example, even be assigned full operation rights when serviced by an unauthorized user. This may include risks, such as an improper network setting of the device which may negatively affect performance of the connected system elsewhere. The assignment of full operation rights to the device serviced by an unauthorized user may be temporarily limited, e.g., for a specific duration. This may allow to reduce risks associated with allowing full operation rights of the device serviced by an unauthorized user. In this case an authorized service person may service the device within the specific duration in order to restore full operation rights without the temporal limitation.

The connected system can include a local authorization device for locally authorizing the servicing of the respective device. The local authorization device can be configured for performing a local authorization interaction with the respective device when it is serviced. This may allow an increased safety of the connected system, as proximity to the device of an entity that wants to service the device is required. This may allow to mitigate the risk of hacking the device by remotely connecting to the device and manipulating the software or firmware of the device.

Locally authorizing the servicing of the respective device can include that the connected system is configured to only request authorization if the local authorization device is in proximity to the respective device. In this case, the respective device can be configured for not allowing to be serviced unless the local authorization device is in proximity to the respective device in order to authorize the servicing. The local authorization device can be configured to locally connect with the respective device when the respective device is serviced. The local authorization device may be connected, for example, wirelessly or by electrical contacts to the respective device. The local authorization device may include, for example, a near field communication (NFC) enabled card or NFC authorization device. The local authorization device may also be a cellular phone, e.g., using a short range communication, such as Bluetooth communication or Zigbee communication for the local authorization interaction. A local authorization interaction may include, for example, interacting with a user interface of the local authorization device, e.g., pressing a button when the local authorization device is in proximity to the device that requires to be serviced. The local authorization interaction may include, e.g., providing an access code from the local authorization device to the device requiring to be serviced and locally determining an access right based on the access code by the device requiring to be serviced, for example, based on a checksum test.

The connected system can be configured for authorizing the servicing of the respective device in a two-step process including a server based authorization and the local authorization interaction. This may allow an improved security of the connected system.

The connected system can include a server. Alternatively, the connected system may also be connected to a server. The server may be a local server, e.g., a server inside of the same building of the connected system, or a remote server, e.g., a cloud based server connected via the internet to the device requiring to be serviced. The server based authorization may include sending a response of an entity that is authorizing with the device from the device or the local authorization device to the server. The server can be configured for determining to which extend the entity can be granted access to the device requiring to be serviced. Alternatively or additionally, the server can be configured for determining the updated operation right to be assigned to the device requiring to be serviced when it is serviced in dependence of the response of the entity. The server can include a database that includes the operation rights of the devices and/or another database, which can include access rights in dependence of the response of the entity.

The local authorization interaction may be performed before, after, or in parallel with the server based authorization. In case the local authorization interaction is performed after the server based authorization, it may for example be performed by interacting with the user interface of the local authorization device, such as pressing a button. In case that the local authorization interaction is performed before the server based authorization, the local authorization interaction may, for example, cause that limited operation rights are assigned to the respective device being serviced. This may be beneficial, in case that a server connection is not available during the servicing of the device. In this case, for example, only after performing the server based authorization, the full operation rights may be assigned to the serviced device. For instance, a local authorization device in form of a cellular phone of a service person may not have server connectivity required for the server based authorization during servicing the device requiring to be serviced. The service person may, in this case, service the device solely based on the local authorization interaction, e.g., having only limited authorization and having a limited operation right assigned to the device. Once the server connectivity is regained, e.g., after the service person left the device, server based authorization is performed and the operation right of the serviced device may be updated accordingly.

The updated operation right can depend on an authorization level of the entity that serviced the respective device. This may allow to improve safety, security and trustworthiness of the connected system.

The entity can be, for instance, a service person, such as a human or a robot. The entity can, for example, also be any user of the device.

The connected system can be configured for storing an authorization level of the entity. The operation rights can depend on the authorization level of the entity. For example, a limited operation right may be assigned to the device when it is serviced by a user with a limited authorization level. Full operation right may be assigned to the serviced device, for example, when the device is serviced by an entity with full authorization level. For example, the device initially serviced by a user without full authorization level, e.g., an unauthorized user, may be serviced by a service person with full authorization level, e.g., an authorized service person, later. The authorized service person may perform additional services, e.g., repairs, or simply verify the services, e.g., repairs, performed by the unauthorized user.

The connected system may further include a database storing the operation rights of the devices of the connected system. The connected system can be configured, when the respective device requiring to be serviced is serviced, to store in the database the updated operation right of at least the respective device.

The database can be a central database or a distributed database. The database may be, for example, arranged at the server of the connected system. The connected system can also include one or more databases.

The connected system may be configured for storing in the database a change to the respective device performed for servicing it. This may allow an improved maintenance management of the connected system.

The updated operation right may depend on the change to the respective device performed for servicing it. This may allow a further improved trustworthiness, safety, and security of the connected system, as risks associated with a certain change can be considered when assigning the updated operation right to the serviced device.

The change performed for servicing the respective device may be stored together with a date when the change was performed.

The database can store a servicing history, including how and when the devices were serviced. The servicing history may include, for example, the changes performed to the devices of the connected system and the dates when the changes were performed. The servicing history may also include, for example, when an entity accessed the device without performing any changes to the device. Furthermore, the servicing history may include, for example, authorization levels of the entities that accessed and/or serviced the devices. The updated operation right of the respective device may also depend on its servicing history. This allows to consider further factors for assigning operation rights to the devices, e.g., how old parts of the device are and associated risk of failure of the device or parts of the device.

The functionality of the serviced device can depend on the change to the respective device performed for servicing it. This may allow different levels of functionality to reflect different levels of change to the serviced device.

The respective device can be configured for signaling status information indicating its operation right in dependence of how the respective device was serviced. This may allow to inform and warn local users about an operation mode of the serviced device. Furthermore, it may be ensured that a manufacturer or service provider receives status information about the servicing of the device in order to decide whether or not it is necessary to send an authorized service person for servicing the device.

The respective device can be configured for signaling the status information locally for users in proximity of the respective device, to a server to which the connected system can be connected, or both for signaling the status information locally for users in proximity of the respective device and to a server to which the connected system can be connected.

The server may be a remote server, e.g., a server of a manufacturer or service provider. This allows the manufacturer or service provider to react to the status information provided by the respective device. The respective device may be configured for signaling the status information to the server in order to cause the server to instruct an authorized entity to service the serviced device in case it was serviced by an unauthorized user. In this case, for example, the respective device needs to be checked by an authorized entity in order to restore full operation rights.

The respective device may be configured for signaling the status information to nearby users, for example, by an acoustical or optical status signal, such as blinking or pulsating, e.g., during power up of the device. The status signal may indicate a limited functionality of the serviced device to the nearby users and may serve as a warning.

The connected system can be configured for providing information about the consequences when the respective device requiring to be serviced is serviced, in dependence of how the respective device is serviced, e.g., when the respective device requiring to be serviced is serviced by an unauthorized entity. For example, the connected system can display the information about the consequences on a display. The information about the consequences can include, for example, an agreement to loose factory warranty or a warning that the respective device will have only limited functionality if the servicing is performed by an unauthorized entity. This may allow to provide users with information of how the operation of the device may be limited before they perform the servicing.

How the respective device requiring to be serviced can be serviced may depend on an authorization contract. The authorization contract may include authorization codes that change over time, e.g., regularly. The authorization contract may need to be renewed to keep an authorization for servicing the respective device.

In a further aspect of the present invention a method for servicing a respective device requiring to be serviced is presented. The respective device is included in a connected system including a plurality of devices to each of which a respective operation right is assigned. An operation mode of each of the devices depends on its assigned respective operation right. The method comprises the step:

when the respective one of the devices requiring to be serviced is serviced, assigning an updated operation right to at least the respective device in dependence of how the respective device is serviced. This allows similar advantages as described with respect to the connected system.

The method may further comprise one or more of the steps:

detecting when the respective device requires to be serviced, signaling when the respective device requires to be serviced, when an entity starts to service the respective device, requesting an authorization for servicing the respective device from the entity, checking an authorization level of the entity based on a received response to the authorization request, when the entity services the respective device by performing a change to the respective device, updating the operation right of at least the respective device based on the authorization level of the entity, based on the change to the respective device performed for servicing it, or based on both the authorization level of the entity and the change to the respective device performed for servicing it, storing the updated operation right of at least the respective device, storing the change to the respective device performed for servicing it, signaling status information of the respective device indicating its operation right in dependence of how the respective device was serviced.

The connected system may include a database storing the operation rights of the devices of the system. The method may additionally comprise the step:

when the respective one of the devices requiring to be serviced is serviced, storing in the database an updated operation right of the respective device in dependence of how the respective device is serviced.

The updated operation right of the respective device, the change to the respective device performed for servicing it, or both the updated operation right of the respective device and the change to the respective device performed for servicing it may, for example, be stored in a database, e.g., the database of the connected system.

A right to repair may be assigned to the entity based on the authorization level of the entity. The authorization level of the entity may depend or correspond to a certification level of the entity.

Starting the servicing of the respective device can include, for example, opening an enclosure of the respective device or connecting to the respective device, e.g., via a wireless connection or via a physical connection, such as via a local service port.

In a further aspect of the present invention a computer program product for servicing a respective device requiring to be serviced is presented. The respective device is included in a connected system. The computer program product comprises program code means for causing a processor to carry out the method as defined in claim 12 or any embodiment of the method, when the computer program product is run on the processor.

In a further aspect a computer readable medium having stored the computer program product of claim 14 is presented. Alternatively or additionally the computer readable medium can have the computer program product according to any embodiment of the computer program product stored.

It shall be understood that the connected system of claim 1, the method of claim 12, the computer program product of claim 14, and the computer readable medium of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
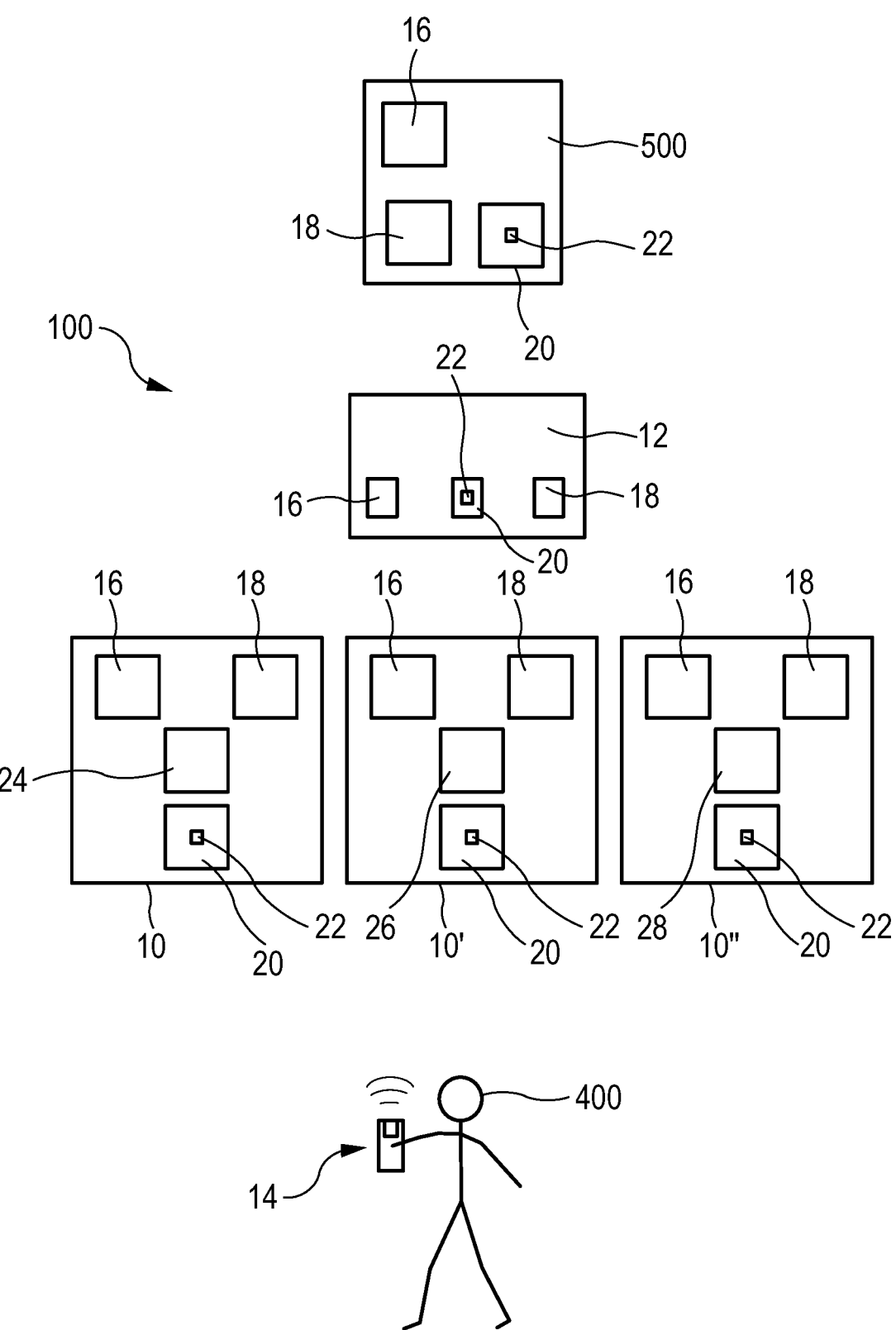
FIG. 1 shows schematically and exemplarily an embodiment of a connected system including a device requiring to be serviced.

FIG. 1 shows schematically and exemplarily an embodiment of a connected system in form of a CL system 100. In this embodiment, the CL system 100 is installed in an escape route of a building (not shown). Right-to-repair laws may mandate that connected systems, such as the CL system 100, need to be repairable even for not perfectly trained people. The CL system 100, in this embodiment, is a safety critical system, as it is arranged in the escape route for guiding the way out of the building during an emergency. Therefore, it is important that devices of the CL system 100 are serviced as soon as possible when they require to be serviced, e.g., if they are broken and require to be repaired or parts of them to be replaced. Some of the devices may further include beyond-lighting safety critical components such as people counting, which may also be used for evacuation of the building.

Modern lighting systems are increasingly connected and smart. This imposes risks of malfunction as a result of untrained people servicing the CL system 100, e.g., making changes to the devices such as replacing broken parts. Servicing by non-authorized persons can lead to system malfunction and unstable or unreliable behavior.

However, authorized service persons for connected systems, such as the CL system 100 may be scarce and/or located distant to the building with the device of the connected system requiring to be serviced. Therefore, no authorized service person might be available within a decent amount of time after the device started working improperly and requiring service, such as within 24 hours, if the device fulfills either a critical lighting function or houses a critical beyond-lighting functionality.

The CL system 100 allows urgent servicing of devices requiring to be serviced to be first performed by untrained and unauthorized users while safeguarding security and data-trustworthiness of the CL system 100 until a fully authorized entity, e.g., service person, visits the building to check and authorize the servicing performed by the unauthorized user or perform further servicing in order to restore the full functionality of the device.

The CL system 100 includes a plurality of devices in form of a luminaire 10, a sensor 10', and a local control switch 10". Furthermore, CL system 100 includes a local server 12, and a local authorization device 14. The CL system 100 can be used for an improved servicing of the luminaire 10, sensor 10', and local control switch 10". In this embodiment, the luminaire 10, the sensor 10', and the local control switch 10" are wirelessly connected devices.

An entity in form of a service person 400 carries the local authorization device 14 and is in proximity to the luminaire 10, sensor 10', and local control switch 10". In other embodiments, the local authorization device may be a cellular phone of the service person. The entity may also, for example, be an autonomous system, like a service robot for servicing the devices.

The CL system 100 is connected to a remote server 500 of a service provider. In other embodiments, the remote server may be, for example, a remote server, such as a cloud based server of a manufacturer of the connected system or device.

Each of the devices 10, 10' and 10", as well as the local server 12, and the remote server 500 includes a processor 16, a transceiver unit 18, and a computer readable medium in form of a memory 20.

Processor 16 is configured for processing data, e.g., performing calculations, processing control signals, generating signals, or performing any other processing step.

The transceiver unit 18 includes a transceiver and an antenna array. In this embodiment, the transceiver unit 18 supports NFC in form of Bluetooth Low Energy (BLE). In other embodiments, the transceiver unit may also support, for example, Zigbee or any other short range communication protocol. Furthermore, the transceiver unit 18 supports WiFi. The remote server 500 is connected to the local server 12 of the connected system 100 via the internet.

In other embodiments, the transceiver units of the devices and servers may also be different, e.g., supporting different communication protocols.

The memory 20 includes a database 22. The memory 20 additionally stores a computer program product, e.g., a computer program product for servicing a device requiring to be serviced, which is included in the connected system. The computer program product comprises program code means for causing any of the processors 16 to carry out a method for servicing the device requiring to be serviced, e.g, as described with respect to FIG. 2 and FIG. 3, when the computer program product is run on any of the processors 16.

Luminaire 10 additionally includes a lighting element 24 for providing light.

Sensor 10' additionally includes an occupancy sensor 26 for detecting and counting people. The sensor 10' may provide occupancy information generated by its occupancy sensor 26 to the local server 12 and the luminaire 10. The luminaire 10 may be activated based on the occupancy information in case that a person is detected in the escape route in which the sensor 10' and the luminaire 10 are arranged.

Local control switch 10" includes a user interface 28 which can be interacted with by a user for generating control signals, e.g., control signals for activating or deactivating the luminaire 10. The control signals can be transmitted from the local control switch 10" to the luminaire 10 and the local server 12 via their transceiver units 18 in order to control the luminaire 10, e.g., activating or deactivating it.

A respective operation right is assigned to each of the devices 10, 10', and 10". In this embodiment, the operation rights assigned to the devices 10, 10', and 10" are stored in the database 22. An operation mode of each of the devices 10, 10', and 10" depends on its assigned respective operation right.

When the devices 10, 10', and 10" are serviced, a respective updated operation right is assigned to them in dependence of how they are serviced. How they are serviced includes for example an authorization level of the service person that services the device as well as the change performed to the device for servicing it. The respective updated operation right of the serviced device as well as the authorization level of the service person and the change performed to the device for servicing it are stored in the database 22.

For example, when the occupancy sensor 26 of the sensor 10' is replaced by an unauthorized user, the updated operation right assigned to the sensor 10' may limit the functionality of the sensor 10'. In particular, the trustworthiness of the occupancy information generated by the occupancy sensor 26 may be limited. Therefore, as the luminaire 10 is arranged in an escape route it may not be allowed to fully switch off its lighting element 24, but only to switch to a certain brightness level, e.g. 20%, when no occupancy in the escape route is detected by the sensor 10'. If the sensor 10', on the other hand, is serviced by an authorized service person the updated operation right assigned to it, allows operation with full functionality and its occupancy information is trustworthy. In this case, the luminaire 10 can fully switch off its lighting element 24 in case that the sensor 10' detects no occupancy in the escape route.

In this embodiment, the devices 10, 10', and 10" additionally request an authorization for servicing them when they are to be serviced. In other embodiments, access to the device for servicing it may not require authorization. The authorization request is transmitted to the local authorization device 14. The local authorization device 14 performs a local authorization interaction in order to authorize the servicing. In this embodiment, the local authorization device 14 provides an access code, which is checked in the device to be serviced using a checksum test. In other embodiments, other authorization methods may be performed, e.g., a two-step process including a server based authorization and the local authorization interaction.

Access to the devices 10, 10', and 10" can be limited in dependence of a response to the authorization request. Which parts of the device may be serviced depends on an authorization level of the service person 400. The devices 10, 10', and 10" are logically locked and include a mechanically locked enclosure in order to limit access to the devices 10, 10', and 10" in case that the service person 400 does not have a sufficient authorization level. The logically locking and mechanical locked enclosure are optional.

Access to the devices 10, 10', and 10" and the updated operation rights assigned to them when they are serviced, can depend on a location, a function, or both the location and the function of the serviced device. They can in particular depend on whether the serviced device is critical for operating the CL system 100, e.g., safety critical, security critical, associated with critical business operation, or a combination thereof. In this embodiment, the luminaire 10 and the occupancy sensor 10' are critical for operating the CL system 100 as their proper operation ensures that the escape route can be safely used. The local control switch 10" is not safety critical if the luminaire 10 and occupancy sensor 10' work properly. In order to ensure that the safety critical devices can be operated at all times, access for servicing them is typically granted also for unauthorized users.

The devices 10, 10', and 10" signal status information indicating its operation right to the local server 12 and the remote server 500. The local server 12 and the remote server 500 may use the status information for deciding whether an authorized service person needs to service or authorize the servicing of the devices 10, 10', and 10". The luminaire 10 additionally signals the status information locally for users in proximity of the luminaire 10. Therefore, the lighting element 24 of the luminaire 10 pulsates for a certain duration in a specific pattern in order to indicate its operation right when it is activated. The pattern depends on the operation right. This allows to warn nearby users, e.g., in case that the luminaire 10 does not operate with full functionality.

In other embodiments of the connected system, a behavior degradation of the connected system may be programmed dependent on legal requirements of a country or state where the connected system is installed. For instance, California may have different right-to-repair laws than Texas. Hence, in Texas only authorized service persons may be granted access to the devices of the connected system, while in California also unauthorized users may be granted access for servicing the devices as the law requires it. The updated operation rights assigned to the device, may nevertheless depend on an authorization level of the service person that serviced the device of the connected system. For example, only operation rights for core lighting functionality, e.g., lighting controls performance required by building codes, may be assigned to the devices of a CL system when serviced by an unauthorized user.

In yet another embodiment, a service status variable may be provided in a constant memory space. The service status variable may count non authorized services performed to the devices in dependence of the authorization of the service person that serviced the devices and the changes performed for servicing the devices. Certain changes may not increase the count of the service status variable. A trusted status of the device may depend on the count of the service status variable. The count of the service status variable may be reset if previous services performed by unauthorized users are authorized by an authorized service person. For each device function a sensitivity against service mistakes may be factored in an algorithm for updating the operation rights by comparing the service status variable against a device function dependent threshold. So very sensitive device functions, e.g., related to electricity billing or power-metering, may be limited when a first service is performed by an unauthorized user. In further embodiments, different service status variables may be provided for different device functions, allowing a fine granularity of servicing history and assigning a trusted status.

The service status variables may be monitored by the local server or the remote server. The service status variable may be assigned separately in each system component. System components may include devices and modules. Modules include one or more devices that, for example, perform a certain function of the connected system, as providing light, context awareness sensing, providing power and/or connectivity to other devices such as non-lighting sensors or other building system components such as HVAC devices, or the like. Summing up all service status variables of a device, a module or the connected system provides an indication of the trustworthiness of the behavior of this device, module or the connected system. For instance, if a luminaire is also used for RF sensing, an orientation of the wireless radio of the luminaire influences the people counting. If a wireless troffer luminaire is, for example, installed with its wireless radio located to a side of the luminaire facing to the inside of a room, it may reliably detect occupancy. If, however, the luminaire is rotated such that the wireless radio faces to a wall, the occupancy detection performance may be still acceptable, but counting people may not be trustworthy as mistakenly people in an adjacent room may be counted and hence an activity level in the room may be overestimated. An unauthorized user may not be aware of arranging the luminaire in the correct orientation for allowing a correct people counting. An authorized service person, however, is well aware of such details and will install the luminaire in an optimal orientation for people counting.

In another embodiment, access to the devices may be restricted by mechanically locked enclosures. For instance, local authorization actions may need to be performed in proximity to the local server in order to access the devices of the connected system. In particular, a button on the local server may need to be pushed in order to access the devices of the connected system for servicing them. The local server may be locked in an IT room and may not be accessible after hours for users. This makes it impossible for the user to press the button on the local server for authorizing the servicing. Access to the devices may also be restricted by logically locking the devices, e.g., locking certain functions in a service user interfaces for servicing the devices, such as updating software or firmware or resetting the devices.

Each access by service persons may be recorded and stored in the database of the device, the local server, or the remote server. This may be used as servicing history in order to determine trustworthiness of the device. The servicing history may also be considered when updating the operation right of the device.

In yet another embodiment, servicing, e.g., a certain change performed for servicing a device, may only be allowed when the service person agrees to step back in either trusted status or factory warranty.

In another embodiment, access for performing OTAU of the firmware may only be initiated by an authorized service person. For instance, if a replacement part of a device has been on stock in a wholesaler's warehouse for a while and hence has an outdated firmware version, an unauthorized user may not be allowed to upgrade its firmware. Therefore, only a limited feature set of an old firmware version may be available for the time being.

An authorization of the service person may also directly open access to online resources which are not available to unauthorized users.

Figure 2:
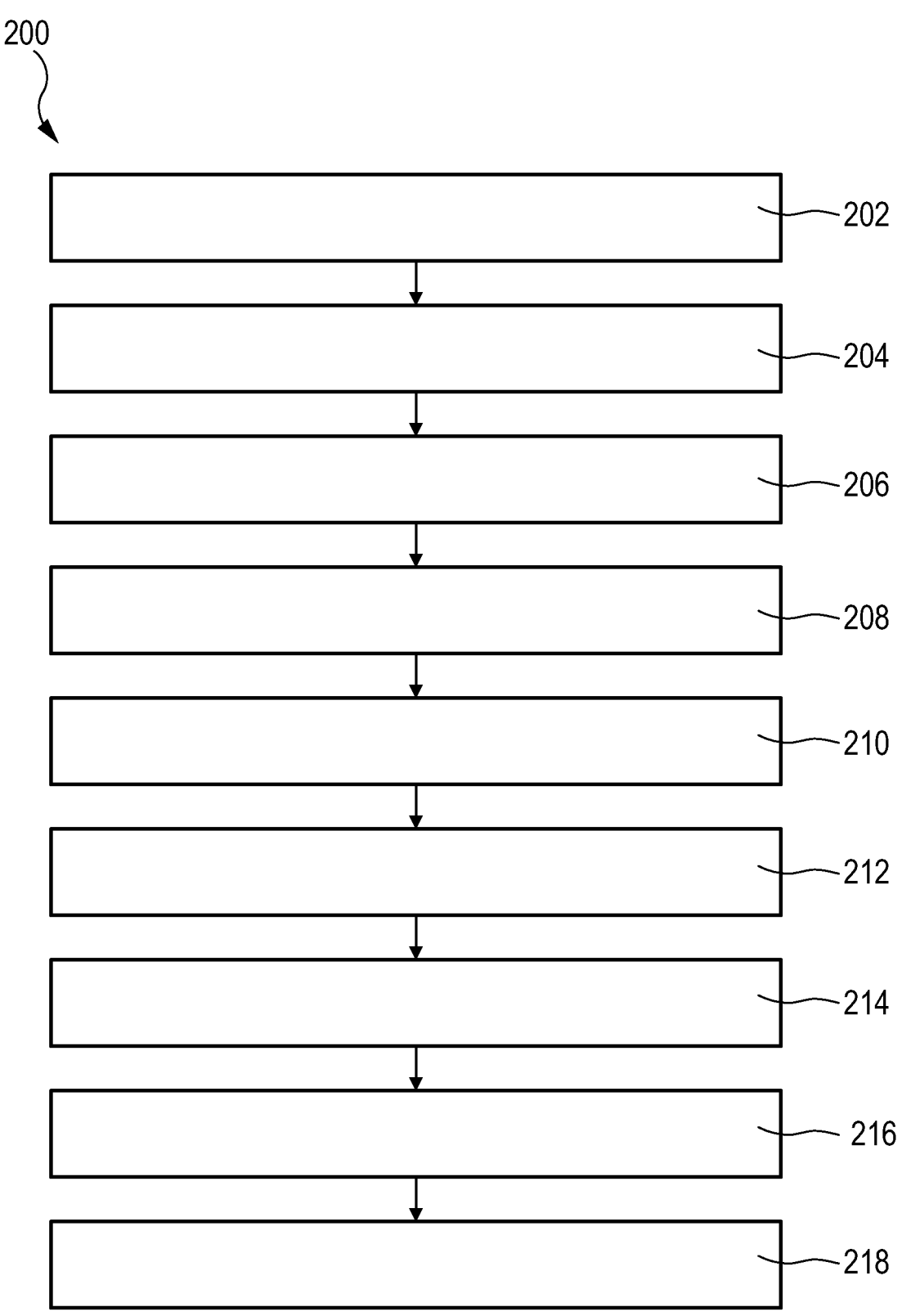
FIG. 2 shows a schematic flow chart of a first embodiment of a method for servicing a device of a connected system.

FIG. 2 shows a schematic flow chart of a first embodiments of a method for servicing a device of a connected system. The connected system can for example be the CL system 100 described with respect to FIG. 1. The device is included in a connected system including a plurality of devices to each of which a respective operation right is assigned. An operation mode of each of the devices depends on its assigned respective operation right.

In step 202, it is detected when a device requires to be serviced.

In step 204, it is signaled when the device requires to be serviced.

In step 206, an authorization for servicing the device is requested from an entity, when the entity starts to service the device.

In step 208, an authorization level of the entity is checked based on a received response to the authorization request.

Step 210 can for example be performed, when the entity services the respective device by performing a change to the respective device. In step 210, the operation right of the respective device is updated based on the authorization level of the entity, based on the change to the respective device performed for servicing it, or based on both the authorization level of the entity and the change to the respective device performed for servicing it. In other embodiments, also operation rights of other devices of the connected system may be updated.

Step 212 is performed when the device requiring to be serviced is serviced. In step 212, the updated operation right is assigned to the device that is serviced. Therefore, the updated operation right depends on how the respective device is serviced. In other embodiments, also the updated operation rights of the other devices may be assigned to the other devices.

In step 214, the updated operation right of the respective device is stored. In other embodiments, the updated operation rights of the other devices may be stored.

In step 216, the change to the respective device performed for servicing it is stored.

In step 218, status information of the respective device indicating its operation right in dependence of how the respective device was serviced is signaled.

Figure 3:
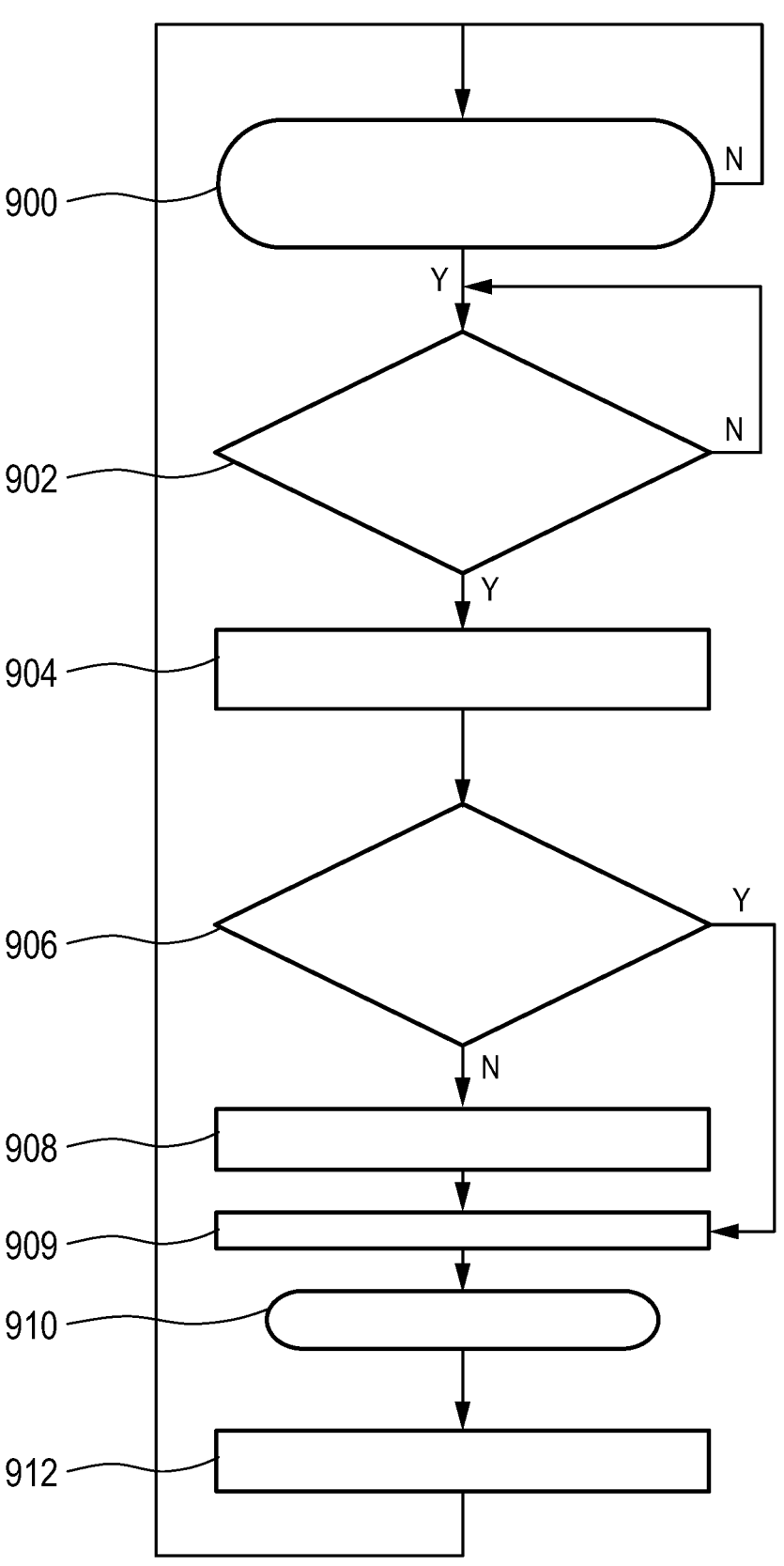
FIG. 3 shows a schematic flow chart of a second embodiment of a method for servicing a device of a connected system.

FIG. 3 shows a schematic flow chart of a second embodiments of a method for servicing a device of a connected system. The connected system can for example be the CL system 100 described with respect to FIG. 1.

In step 900, it is detected whether a device requires to be serviced. In this embodiment, sensors of the CL system detect whether parts of the devices are working properly. The sensors regularly send status information to a control unit of the connected system that detects whether a device requires to be serviced. Step 900 is repeated if no device requiring to be serviced is detected. If a device requiring to be serviced is detected, step 902 is performed. Step 900 is performed as long as no device requires to be serviced.

In step 902, it is detected when servicing of the device requiring to be serviced is started. In this embodiment, it is detected whether an enclosure of the device is opened and/or whether a local authorization device is connected to the device, e.g., via a local service port. In this embodiment, the local authorization device is present in form of an NFC enabled card that is used for wirelessly connecting to the device requiring to be serviced. The enclosure of the device requiring to be serviced may be mechanically locked and a user interface of the device may be logically locked. Step 902 is repeated if no start of servicing of the device requiring to be serviced is detected. Step 902 is repeated as long as the start of servicing is not detected. If the start of servicing of the device requiring to be serviced is detected, step 904 is performed.

In step 904, an authorization for servicing the device requiring to be serviced is requested from the service person that services the device. In order to allow fast servicing under very special circumstances like after hazardous events or without any connectivity to a remote authorization server, access codes may be used for locally authorizing the service person. The access codes may be locally checked for validity, e.g., using a checksum test.

In other embodiments, a two-step authorization with a local authorization interaction and a server based authorization may be required for authorizing the servicing of the device. Access codes may easily leak and may be considered not very secure. In order to improve security, full authorization may be only provided when connectivity to the remote authorization server is reestablished and the remote server can authorize the servicing. The remote authorization server may include a catalog of authorized service persons. The authorization of the service person may be checked with the catalog to ensure authorization.

In yet other embodiments, the two-step authorization may include a server based authorization in form of checking an authorization level of a service person and the local authorization action may include locally interacting with the device requiring to be serviced, e.g., pushing a button, in order to ensure that the service person is in proximity to the device requiring to be serviced.

In step 906, an authorization level of the service person is checked based on the response of the service person to the authorization request. In this embodiment, the service person provides his access code. There are only two authorization levels, in this embodiment, namely authorized and unauthorized. The authorized authorization level grants full access to the device and full operation rights can be assigned to the device when it is serviced. If the service person is an authorized service person, it can perform its servicing of the device in step 909.

In this embodiment, the unauthorized authorization level also grants full access to the device. But only limited operation rights can be assigned to the device when it is serviced by an unauthorized user. If the service person is an unauthorized user, step 908 is performed.

In other embodiments, also the access to the device may be limited in dependence of the authorization level. Alternatively or additionally, different authorization levels may be used, e.g., in order to allow an improved differentiation between service persons.

In step 908, an untrusted status is set for the service being currently performed to the device requiring to be serviced. Therefore, only limited operation rights can be assigned when servicing is finished. After step 908 or in parallel to step 908, step 909 is performed.

In step 909, the service person performs its servicing of the device, e.g., repairing the device, changing parts of the device, installing software, updating software, updating firmware, resetting the device, or any other servicing of the device requiring to be serviced. For example, a broken sensor may be replaced. Once finished, step 910 is performed.

In step 910, a change performed to the device for servicing it is recorded and stored in the device. In other embodiments, the change performed to the device for servicing it may be stored, for example, in a database of the connected system and/or in a database of a remote server. Furthermore, it is stored which service person serviced the device and a date of the servicing. This information allows to determine how the device was serviced. After storing or parallel to the storing, step 912 is performed.

In step 912, an updated operation right is assigned to the device in dependence of the change performed to the device, as well as whether the service was performed in the untrusted status. In other embodiments, the updated operation right may be assigned including any other information related to how the device was serviced. In this embodiment, an updated operation right is determined by an algorithm that uses the change performed to the device as well as whether the servicing is performed in untrusted status as input. In other embodiments, an algorithm for determining the updated operation right may include any other information related to how the device was serviced in order to determine the updated operation right.

In this embodiment, generally a limited updated operation right is assigned to the device if an unauthorized user serviced the device. The limitations of the functionality of the device associated to the limited operation right, depend on what change has been performed to servicing the device. For instance, if a power-supply of the device was replaced by a new power supply, an utility power metering functionality performed by the device may be disabled or not trusted for electricity billing purposes. If the device is for example a luminaire-based wireless sensor and other functional units, such as a sensor unit remains unchanged, full data reporting of the sensor unit may be enabled. Limited functionality of the device may also result in limited functionality of the connected system as a whole.

In other embodiments, a service notification may be issued to a remote server, e.g., a cloud based server, providing status information indicating the change performed for servicing the device and the service person that serviced the device. If the functionality of the device and/or the connected system is limited, this information may also be signaled to the remote server. The remote server may accordingly cause an authorized service person to service the device in order to restore full functionality of the device and/or connected system.

The updated operation right and/or access to the device may also depend on the location of the device requiring to be serviced. For example, a battery-operated standalone occupancy sensor may be replaced in an escape route with luminaires by an unauthorized user. The data provided by the sensor may therefore be not trustworthy. The luminaires in the emergency way may not switch off the lighting during vacancy due to the lack of trustworthy data. Instead the luminaires may operate with reduced lighting level, e.g., 20% brightness. Once an authorized service person has visited the escape route and checked and authorized the replacement of the occupancy sensor, data provided by the sensor may be trusted again and luminaires may switch off during vacancy.

In an embodiment of the method, a factory service may allow regaining a trusted status or a factory warranty for the device serviced by an unauthorized user.

In another embodiment of the method, authorization contracts may provide the access codes for locally authorizing for servicing the device. The access codes may regularly change. The authorization contracts may need to be signed in order to keep authorization. The authorization contracts may include access rights to online resources and training material for authorized service persons. The authorization contracts may, for instance, be combined with a certification program for a service person. In this case the authorization level of the service person may depend on whether or not the certification program was performed within a predetermined timelimit.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein a connected system including diverse networked systems such as lighting systems, security systems, HVAC system, and other networked systems can be serviced. The connected system may be controlled, for example, by a cloud-connected BMS.

Other variations to the disclosed embodiments can be understood and effected by those skilled in the art in practicing the claimed invention, from a study of the drawings, the disclosure, and the appended claims.

In the claims, the word "comprising" and "including" does not exclude other elements or steps, and the indefinite article "a" or "an" does not exclude a plurality.

A single unit, processor, or device may fulfill the functions of several items recited in the claims. The mere fact that certain measures are recited in mutually different dependent claims does not indicate that a combination of these measures cannot be used to advantage.

Operations like assigning an updated operation right to the respective device in dependence of how the respective device is serviced when the respective one of the devices requiring to be serviced is serviced, detecting when the respective device requires to be serviced, signaling when the respective device requires to be serviced, requesting an authorization for servicing the respective device from an entity when the entity starts to service the respective device, checking an authorization level of the entity based on a received response to the authorization request, updating the operation right of the respective device based on the authorization level of the entity, based on a change to the respective device performed for servicing it, or based on both the authorization level of the entity and the change to the respective device performed for servicing it when the entity services the respective device by performing the change to the respective device, storing the updated operation right of the respective device, storing the change to the respective device performed for servicing it, signaling status information of the respective device indicating its operation right in dependence of how the respective device was serviced, et cetera performed by one or several units or devices can be performed by any other number of units or devices. These operations and/or the method can be implemented as program code means of a computer program and/or as dedicated hardware.

A computer program product may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope.

The present invention relates to servicing devices requiring to be serviced. The devices are included in a connected system. A respective operation right is assigned to each of the devices. An operation mode of each of the devices depends on its assigned respective operation right. When a respective one of the devices requiring to be serviced is serviced, an updated operation right of the respective device is assigned to the respective device in dependence of how the respective device is serviced. Access to the device for servicing it may be dependent on an authorization. A functionality of the serviced device may be limited if an unauthorized user serviced the device.

The invention claimed is:

1. A connected system comprising:
a processor;
a plurality of devices, each of the plurality of devices having a respective operation right assigned thereto, an operation mode of each of the plurality of devices being configured to depend on the assigned respective operation right;
wherein when a respective device of the plurality of devices requiring to be serviced is serviced, the connected system is configured to assign an updated operation right to at least the respective device in dependence of how the respective device is serviced;
wherein when at least the respective device is serviced by an unauthorized user, the connected system is configured to assign a limited operation right to at least the respective device with an operation mode that allows only a limited functionality of at least the respective device;
wherein when at least the respective device is serviced by an authorized service person, the connected system is configured to assign a full operation right to at least the respective device with an operation mode that allows full functionality of at least the respective device;
wherein the connected system is configured to request an authorization for servicing the respective device when the respective device is to be serviced, and how the respective device can be serviced depends on a response to the authorization request; and
wherein the plurality of devices includes at least one of a luminaire, a sensor, and a control switch.

2. The connected system according to claim 1, wherein how the respective device can be serviced depends on a location, a function, or both the location and the function of the respective device.

3. The connected system according to claim 1, wherein how the respective device can be serviced depends on whether the respective device is critical for operating the connected system.

4. The connected system according to claim 1, wherein the connected system includes a local authorization device for locally authorizing the servicing of the respective device, and
wherein the local authorization device is configured for performing a local authorization interaction with the respective device when it is serviced.

5. The connected system according to claim 4, wherein the connected system is configured for authorizing the servicing of the respective device in a two-step process including a server based authorization and the local authorization interaction.

6. The connected system according to claim 1, wherein the updated operation right depends on an authorization level of the entity that serviced the respective device.

7. The connected system according to claim 1, further comprising:
a database storing the operation rights of the plurality of devices of the connected system,
wherein the connected system is configured, when the respective device requiring to be serviced is serviced, to store in the database the updated operation right of at least the respective device.

8. The connected system according to claim 7, further configured for storing in the database a change to the respective device performed for servicing it.

9. The connected system according to claim 8, wherein the updated operation right depends on the change to the respective device performed for servicing it.

10. The connected system according to claim 1, wherein the respective device is configured for signaling status information indicating its operation right in dependence of how the respective device was serviced.

11. A method for servicing a respective device of a plurality of devices requiring to be serviced via a connected system, the connected system having a processor and the plurality of devices, each of the plurality of devices having a respective operation right assigned thereto, an operation mode of each of the plurality of devices being configured to depend on the assigned respective operation right, the connected system being configured to assign an updated operation right to at least the respective device in dependence of how the respective device is serviced when the respective device requiring to be serviced is serviced, the method comprising:
when the respective device is to be serviced, requesting an authorization for servicing the respective device, wherein how the respective device can be serviced depends on a response to the authorization request;
when at least the respective device is serviced by an unauthorized user, assigning a limited operation right to at least the respective device with an operation mode that allows only a limited functionality of at least the respective device; and
when at least the respective device is serviced by an authorized service person, a full operation right is assigned to at least the respective device with an operation mode that allows full functionality of at least the respective device.

12. The method according to claim 11, further comprising one or more of the steps:

detecting when the respective device requires to be serviced, signaling when the respective device requires to be serviced, when an entity starts to service the respective device, requesting an authorization for servicing the respective device from the entity, checking an authorization level of the entity based on a received response to the authorization request, when the entity services the respective device by performing a change to the respective device, updating the operation right of at least the respective device based on the authorization level of the entity, based on the change to the respective device performed for servicing it, or based on both the authorization level of the entity and the change to the respective device performed for servicing it, storing the updated operation right of at least the respective device, storing the change to the respective device performed for servicing it, signaling status information of the respective device indicating its operation right in dependence of how the respective device was serviced.

13. A non-transitory computer readable medium comprising computer program code to perform the method of claim 11 when the computer program code is run on one or more processors.

14. A lighting system comprising:

a processor; and a plurality of devices, each of the plurality of devices having a respective operation right assigned thereto, an operation mode of each of the plurality of devices being configured to depend on the assigned respective operation right;

wherein when a respective device of the plurality of devices requiring to be serviced is serviced, the lighting system is configured to assign an updated operation right to at least the respective device in dependence of how the respective device is serviced;

wherein when at least the respective device is serviced by an unauthorized user, the lighting system is configured to assign a limited operation right to at least the respective device with an operation mode that allows only a limited functionality of at least the respective device;

wherein when at least the respective device is serviced by an authorized service person, the lighting system is configured to assign a full operation right to at least the respective device with an operation mode that allows full functionality of at least the respective device; and wherein when the respective device is to be serviced, the lighting system is configured to request an authorization for servicing the respective device, and how the respective device can be serviced depends on a response to the authorization request; and wherein the plurality of devices includes at least one of a luminaire, a sensor, and a control switch.

15. The lighting system according to claim 14, wherein at least one of the plurality of devices is wirelessly connected to the lighting system.

16. The lighting system according to claim 14, further comprising:

a server, the server having at least a processor, a transceiver unit, and memory; and an authorization device;

wherein the lighting system is configured to connect to a remote server.

* * * * *